Sept. 15, 1953

C. H. ANSLEY 2,652,085

FRUIT PITTING AND HALVING MACHINE

Filed July 20, 1950

INVENTOR

Charles H. Ansley

BY Shoemaker & Mattare

ATTORNEYS

Sept. 15, 1953 C. H. ANSLEY 2,652,085
FRUIT PITTING AND HALVING MACHINE
Filed July 20, 1950 8 Sheets-Sheet 2

Fig. 2.

INVENTOR
Charles H. Ansley
BY Shoemaker & Mattare
ATTORNEYS

Sept. 15, 1953          C. H. ANSLEY          2,652,085

FRUIT PITTING AND HALVING MACHINE

Filed July 20, 1950          8 Sheets-Sheet 3

Fig. 3.

INVENTOR
Charles H. Ansley
BY
ATTORNEYS

Sept. 15, 1953  C. H. ANSLEY  2,652,085
FRUIT PITTING AND HALVING MACHINE
Filed July 20, 1950  8 Sheets-Sheet 4

Fig. 4.

INVENTOR
Charles H. Ansley
BY Shoemaker & Mattare
ATTORNEYS

Sept. 15, 1953  C. H. ANSLEY  2,652,085
FRUIT PITTING AND HALVING MACHINE
Filed July 20, 1950  8 Sheets-Sheet 6

INVENTOR
Charles H. Ansley
BY
ATTORNEYS

Sept. 15, 1953 C. H. ANSLEY 2,652,085
FRUIT PITTING AND HALVING MACHINE
Filed July 20, 1950 8 Sheets-Sheet 7

INVENTOR
Charles H. Ansley
BY
ATTORNEYS

Sept. 15, 1953　　　　　　C. H. ANSLEY　　　　　　2,652,085
FRUIT PITTING AND HALVING MACHINE
Filed July 20, 1950　　　　　　　　　　　　　　8 Sheets-Sheet 8

INVENTOR
Charles H. Ansley
BY Shoemaker & Mattare
ATTORNEYS

Patented Sept. 15, 1953

2,652,085

UNITED STATES PATENT OFFICE 2,652,085

FRUIT PITTING AND HALVING MACHINE

Charles H. Ansley, Rochester, N. Y.

Application July 20, 1950, Serial No. 174,915

13 Claims. (Cl. 146—28)

The invention relates to a machine for halving and removing the pits from freestone peaches, apricots, nectarines and other fruits of the freestone variety.

An object of the present invention is to provide a simple and comparatively inexpensive machine of strong, sturdy and durable construction comprising an endless conveyor provided at intervals with fixed blade units or stations on which fruit is manually placed while the conveyor is stationary, and a vertically movable carriage located above the conveyor and provided with knives arranged to cooperate with the fixed blade of the conveyor units and capable, in the downward movement of the carriage, of halving the fruit and of following the contour of the pit thereof and of separation, for freeing the halved fruit from the fixed blade and from the pit and the pit-engaging means to cause the halves of the fruit to fall from the machine while the pit is firmly clamped on the fixed blade.

A further object of the invention is to enable the knife separating means to maintain the knives separated during the major portion of the upward movement of the carriage and while the pit is firmly held upon the fixed blade so that the knives in their upward movement will clear the pit.

It is also an object of the invention to provide means operating during the latter portion of the upward movement of the carriage to relieve the pit of the clamping means and actuate the conveyor a sufficient distance to bring another station or blade unit into position for halving fruit carried by the same, the step-by-step movement of the conveyor finally carrying the pits to the rear end of the conveyor where they are ejected in a continuous operation of the machine.

It is also an object of the invention to provide means for yieldably maintaining the knives in contact with the pit during the cutting operation and means for automatically returning the knives to their initial position after the knife separating means has been operated to free the knives and permit the same to return to cutting position.

It is also an object of the invention to provide a peach halving and pitting machine which will enable fruit to be placed manually on the blades of the stations or units with perfect safety.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the accompanying drawings, in which is illustrated a preferred embodiment of the invention, the fruit halving and pitting machine comprises in its construction a main frame and a super-structure mounted on the main frame. The main frame is composed of a horizontal base plate 1 supported by legs 2. The super-structure comprises a horizontal platform 3 supported by end frames 4 composed of upwardly and inwardly inclined posts 5 connected at their upper ends by an integral horizontal top connecting portion 6, and at an intermediate point by a horizontal connecting portion 7. Any suitable metal or other material may be employed in the construction of the framework composed of the lower main frame and the upper super-structure.

The platform 3 has mounted on its front end portion an electric motor 8 which is connected by a V-belt 9 and pulleys 10 and 11 with a drive unit 12 provided at its front end with a crank 13. The crank 13 is connected by a pitman 14 with a vertically slidable carriage 15 extending longitudinally of the machine from the front to the rear portion of the super-structure and provided with front and rear vertically disposed sleeves 16 and 17 which are slidably mounted on and guided by front and rear vertical rods 18 and 19 arranged in pairs and depending from and having their upper ends rigidly connected with the platform 10 and connected at their lower ends by arms or portions 20 and 21 with the intermediate horizontal connecting portions 7 of the end frames 4 of the super-structure.

Figure 4:
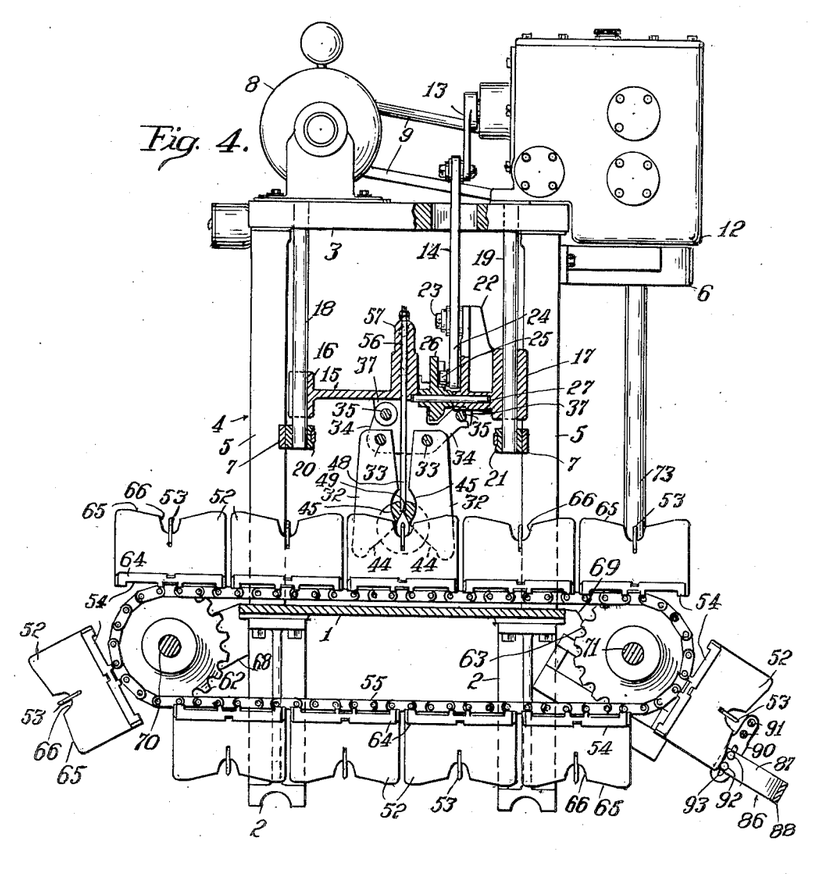
Fig. 4 is a vertical longitudinal sectional view taken substantially on the line 4—4 of Fig. 2.
Figure 5:
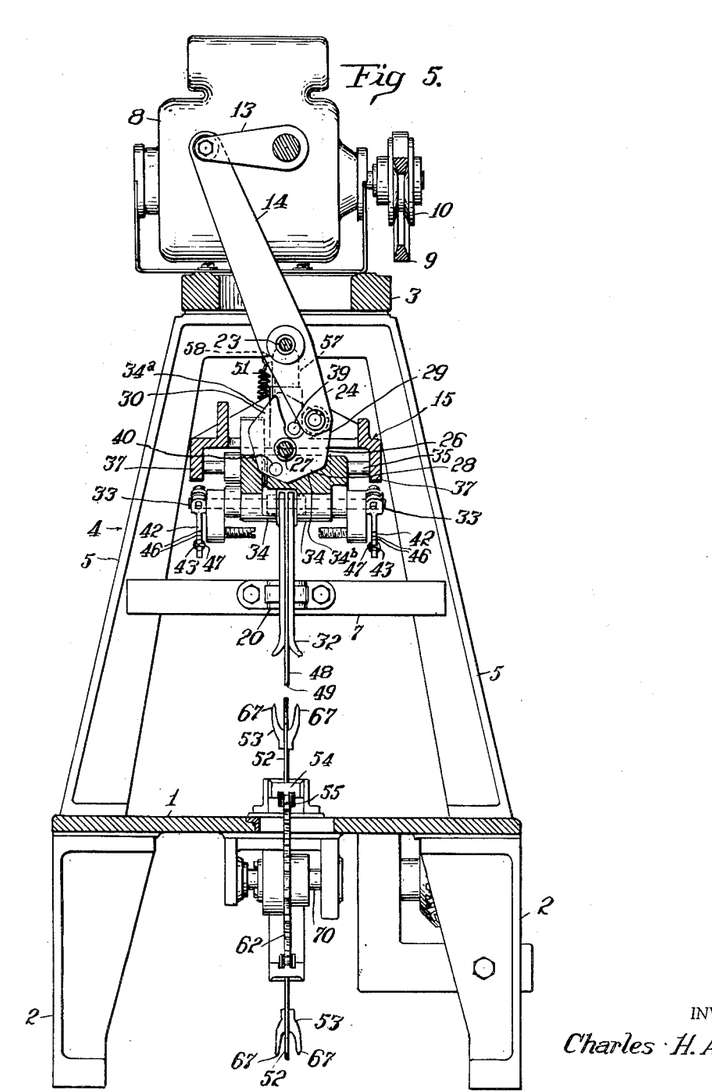
Fig. 5 is a transverse sectional view taken on the line 5—5 of Fig. 1.

The carriage is provided near its rear portion with an upwardly extending post or support 22 and the pitman 14 is pivotally connected with the post or support by a suitable pivot 23 (Figs. 4 and 5) located intermediate of the ends of the pitman to provide a lower arm 24 which is approximately one-half the length of the upper portion of the pitman. When the crank arm or element 13 rotates the pitman will be moved upwardly and downwardly and the lower arm 24 of the pitman will move through an arcuate path at the end portions of the stroke of the pitman. The arm 24 of the pitman 14 is provided with a roller 25 arranged to engage and actuate a knife-spreading cam 26 pivotally mounted at 27 on the carriage and provided in its upper portion with a substantially triangular recess 28 having inclined angularly related side edges or walls 29 and 30 which are alternately engaged by the roller 25 of the arm 24 of the pitman for spreading knives 32 and for maintaining the same in a spread condition to clear the fruit pit and also to release the separated knives and permit the same to be returned to their initial cutting position (Fig. 3).

The knives 32, which are arranged in opposite pairs, are secured to and depend from horizontal pivots 33 mounted in a pair of heads 34 consisting of blocks slidably mounted on horizontal guide rods 35, secured at their ends in openings 36 of vertically disposed arms or portions 37 depending from the carriage 15 at opposite sides thereof. The knife-carrying heads 34 are maintained in abutting relation when the knives are in cutting position by means of coiled springs 38 connected with the blocks 34 and with the depending arms or portions 37 of the carriage.

Figure 2:
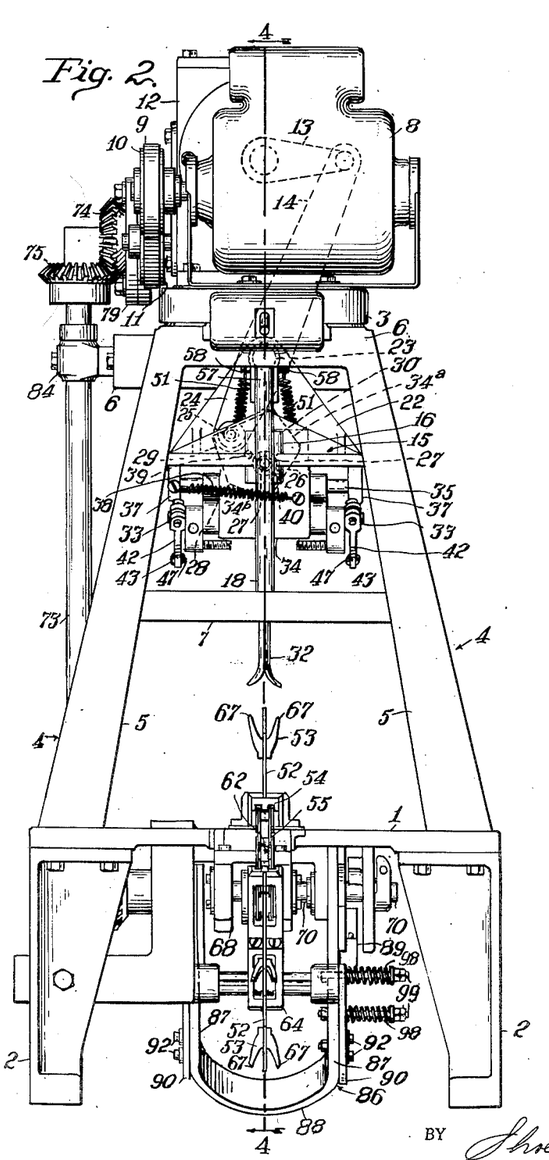
Fig. 2 is an end elevation looking at the left hand end of Fig. 1.
Figure 3:
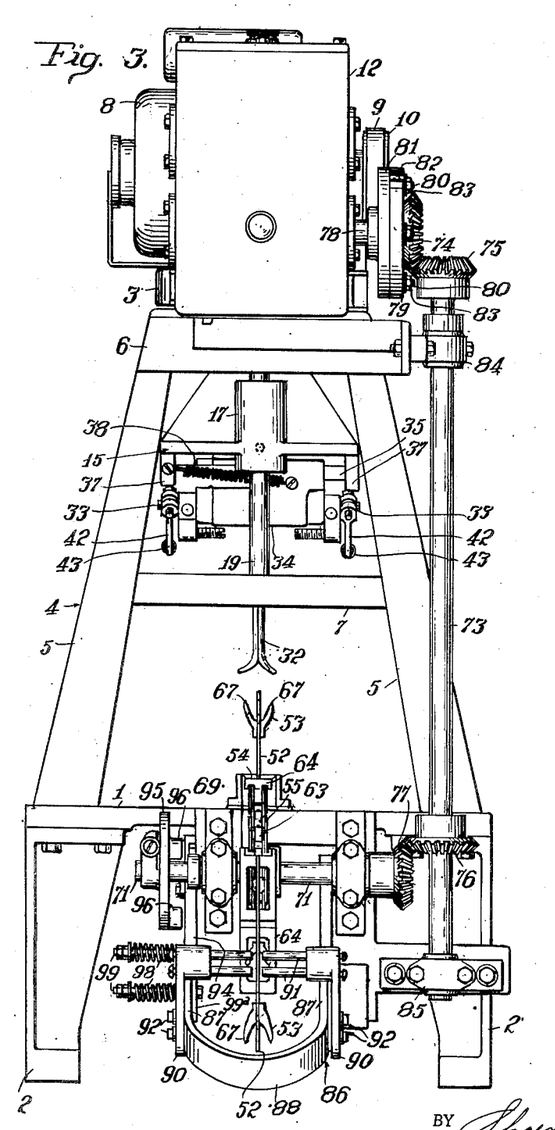
Fig. 3 is an end elevation looking at the right hand end of Fig. 1.

When the parts are arranged as disclosed in Figs. 2 and 3, the heads 34 and the members of each pair of knives 32 are arranged in abutting relation and the roller 25 of the arm 24 is in engagement with the inclined edge 27 of the cam 26 and is located at the left hand side of the cam in Fig. 2. As the pitman 14 approaches the lower end of its stroke, the roller 25 turns the cam 26 on its pivot 27 and separates the knife-carrying blocks. As the pitman 14 approaches the upper end of its stroke the cam 26 is moved in the opposite direction and the tension of the springs 38 draws the knife-carrying blocks together. The lower portion of the cam is preferably slightly tapered and it is provided above and below its pivot 27 with horizontally projecting pins 39 and 40 which are arranged to engage upper and lower horizontal projecting portions 34ª and 34ᵇ of the heads 34, preferably formed by studs or pins mounted in the heads and projecting inwardly therefrom to a position approximately coincident with the inner abutting faces of the said heads 34. The upper and lower pins 39 and 40 are spaced equal distances from the pivot 27 and the heads are recessed to receive the lower tapered portion of the cam and the horizontally projecting portions 34ª and 34ᵇ of the heads.

The pairs of knives 32 are disposed opposite each other and depend from the inner ends of the horizontal pivots 33 which are provided at their outer ends with arms 42 diverging downwardly and inclined downwardly and outwardly. The arms of the opposed knives are connected by coiled springs 43 which urge the knives inwardly and cause the same in the cutting of the fruit to follow the contour of the pit. The knives have inner opposed cutting edges consisting of lower convexly curved downwardly diverging portions 44, and upper concavely curved arcuate portions 45 which, when the knives are in their lowermost position, conform substantially to the contour of the pit of the peach. The arms 42, which are slightly curved, are provided at their lower portions with a plurality of notches 46 which are adapted to be engaged by looped terminal portions 47 of the coiled springs 43 whereby the tension of the springs 43 may be adjusted to urge the knives inwardly with the desired pressure to suit the character of the fruit to be halved and pitted.

Figure 1:
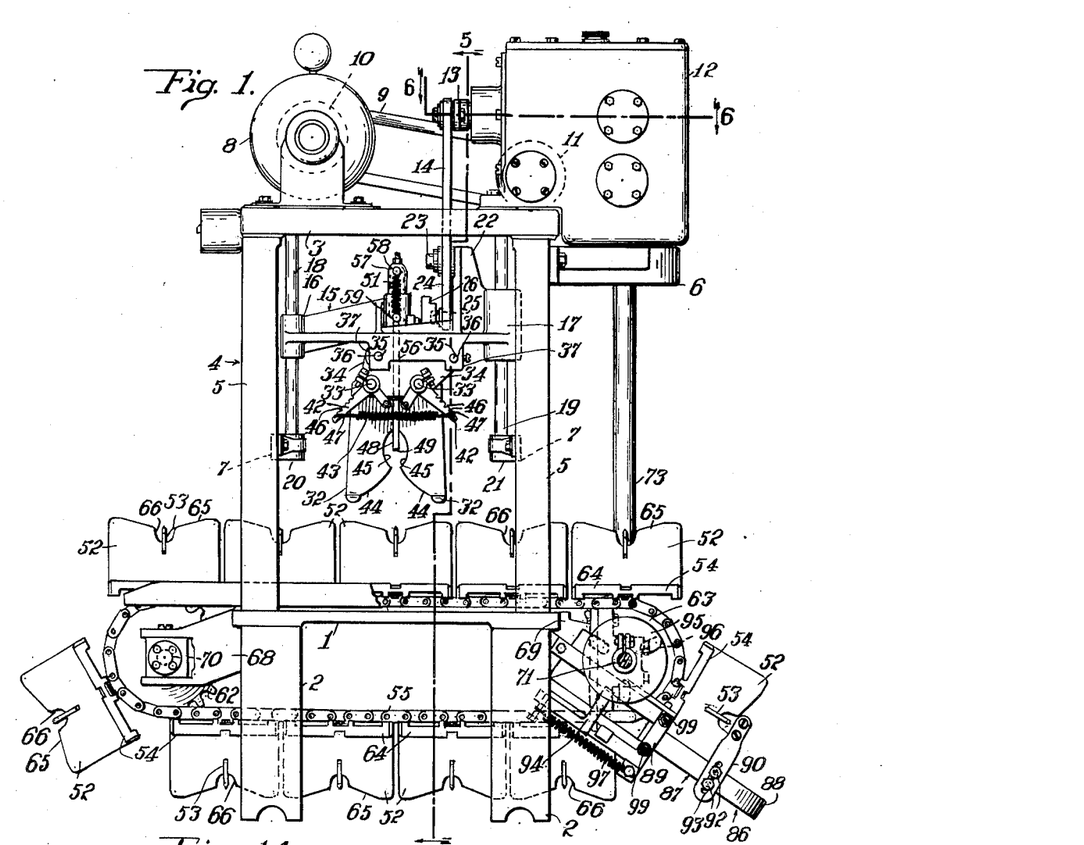
Fig. 1 is a side elevation of a peach halving and pitting machine constructed in accordance with this invention.

When the knives descend from the elevated position illustrated in Fig. 1 of the drawings, they cut the fruit into halves and follow the contour of the pit which is lodged between the upper arcuate portions 45 at the end of the downward movement of the knives.

The vertically movable carriage also carries a spring loaded vertically disposed needle or plunger 48 having a toothed or serrated pit-engaging edge 49 at its lower end. The needle or plunger 48 is urged downwardly by coiled springs 51 which maintain the needle or plunger yieldably in engagement with the fruit pit. The plunger or needle 48 enters the fruit at the top and engages the fruit pit and maintains the same firmly in engagement with a fixed blade 52 and a dart 53 thereof of a station or blade unit 54 carried by an endless conveyor 55. The springs 51 are connected at their upper ends to the needle or plunger 48 and at their lower ends with the carriage and the needle or plunger operates within a bore or opening 56 in the carriage and any suitable means may be employed for limiting its downward movement with relation to the carriage for maintaining the needle or plunger in the position illustrated in Fig. 1 of the drawings when the same is out of engagement with a fruit pit. The pit-clamping needle or plunger 48 is provided at its upper end with a head consisting of a sleeve 57 which is arranged to engage the carriage to limit the downward movement of the needle or plunger. The sleeve 57 is provided at opposite sides with headed studs or projections 58 to which the upper ends of the springs 51 are secured and the carriage is provided with similar heads or projections 59 to which the lower ends of the springs are connected.

The spring loaded fruit pit engaging needle or plunger may, however, be mounted in any other desired manner and it engages the pit after the knives begin their fruit cutting or halving operation and prior to the completion of the downward movement of the knives 32 and will firmly hold the pit against said blade 52 while the knives are completing their downward cutting movement and also while the knives are being separated for freeing the halves of the fruit from the blade 52 and the fruit pit. Of course, the fruit may be manually or otherwise fed to the fruit halving and pitting machine. In any event, the individual fruit is first placed endwise on the fixed blade 52 so that the blade cuts or slits the lower portion of the fruit while the dart prongs 67 engage opposite bottom side portions of the fruit. In this manner the fruit is preliminarily held during the initial downward movement of the blades and until the plunger is engaged against the pit at which time the pit is firmly held as above described.

When the halves of the peaches or other fruit are freed from the blade 52 and the pit by the separation or spreading of the members of the two pairs of knives, they fall from the machine and are received within a suitable conveyor or receptacle (not shown). The particular construction and arrangement and manner of mounting the main frame of the machine afford ample space for conveyor or other means for receiving both the fruit and the pits for proper disposal thereof.

The endless conveyor, which may consist of a belt or chain and pulleys or sprocket wheels 62 and 63, is provided at intervals with blade units 54 which are successively carried by the conveyor from the front end of the machine to a position directly below the knives 32 for cooperating therewith and for constituting a halving and pitting station. Each blade unit comprises a base 64 and a vertical blade 52 extending upwardly from the base and provided with an upper cutting edge 65 having a central pit-receiving recess 66 conforming substantially to the exterior configuration of the lower portion of the pit of a peach. Mounted on the blade 52 at the bottom of the recess 66 is the dart 53 which is tapered downwardly and recessed or cut away at its upper portion to provide a pair of upwardly projecting prongs 67, which extend above the bottom of the recess 66 and engage the fruit pit at opposite sides of the lower portion thereof, whereby the lower end of the fruit pit is firmly seated in the recess 66 of the blade 52 and is maintained in firm engagement with the blade 52 and the dart 53 thereof by the yielding engagement of the spring loaded needle or plunger 48 with the upper end of the pit.

The main frame is provided at opposite ends of the base plate 1 with outwardly extending arms 68 and 69 for supporting the shafts 70 and 71 upon which the pulleys or sprocket wheels 62 and 63 of the endless conveyor are mounted. The shafts 70 and 71 are journaled in suitable bearings of the arms 68 and 69 and any suitable means may be provided for maintaining the endless sprocket chain taut.

Figure 6:
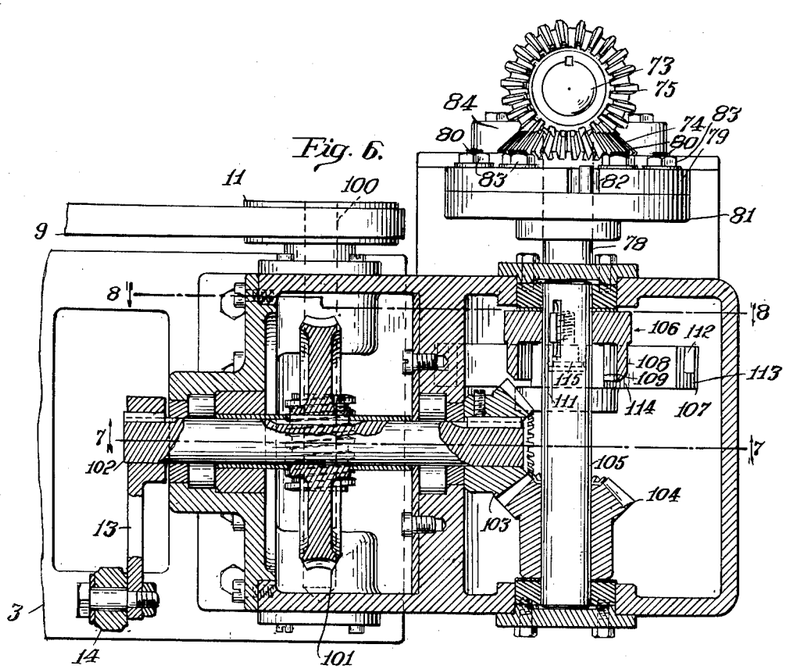
Fig. 6 is a horizontal sectional view of the drive unit taken on the line 6—6 of Fig. 1.
Figure 7:
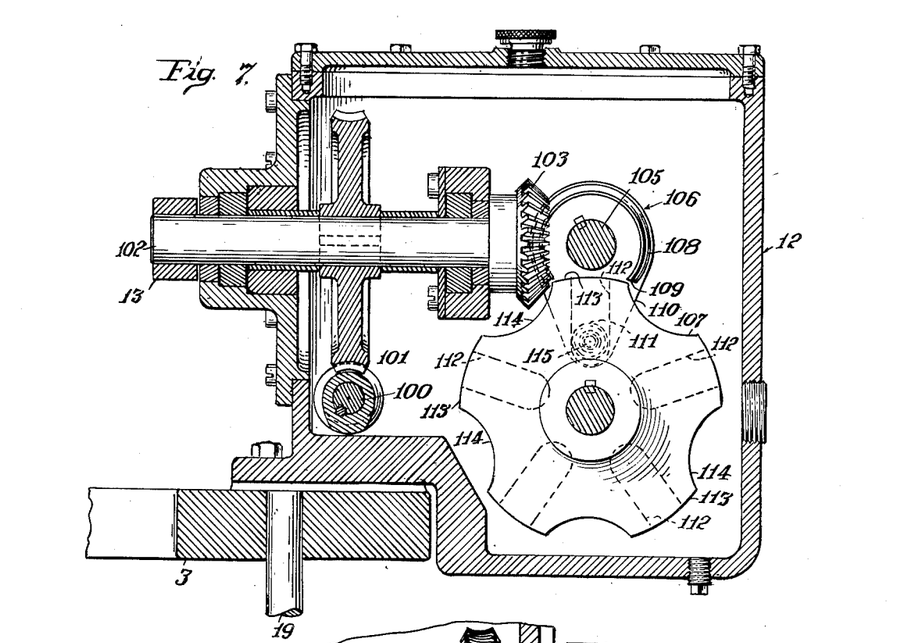
Fig. 7 is a vertical sectional view taken on the line 7—7 of Fig. 6.
Figure 8:
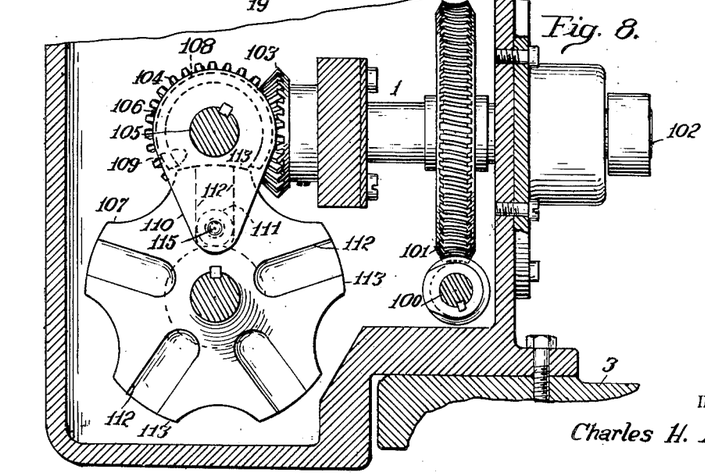
Fig. 8 is a similar view taken on the line 8—8 of Fig. 6.
Figure 9:
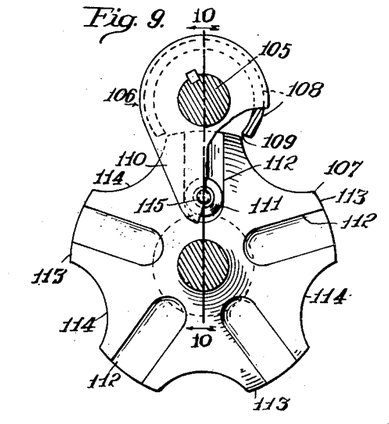
Fig. 9 is a detail view of the crank and the Geneva wheel.
Figure 10:
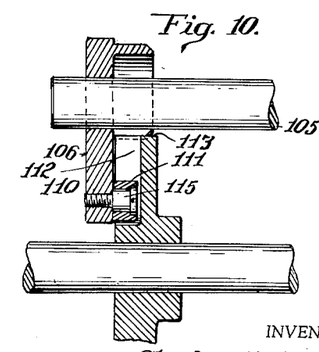
Fig. 10 is a detail sectional view taken on the line 10—10 of Fig. 9.
Figures 11, 12, 13:
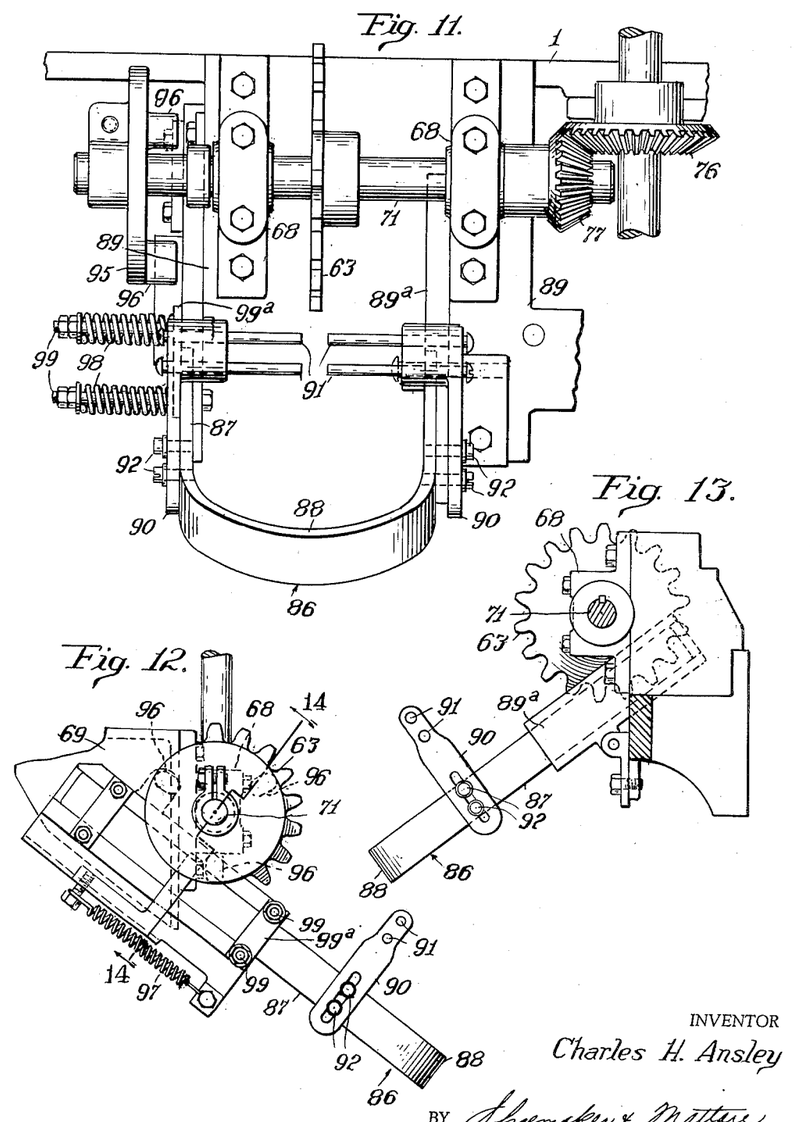
Fig. 11 is an enlarged detail rear elevation of the pit ejecting slide and the means for mounting and operating the same.
Fig. 12 is a side elevation showing the front side of the mechanism illustrated in Fig. 11.
Fig. 13 is a similar view of the rear side of the same.

A step-by-step motion is transmitted from the drive unit to the conveyor by a vertical shaft 73, by upper bevel gears 74 and 75 and lower bevel gears 76 and 77 (Figs. 3, 4 and 6) and as a means for timing the horizontal movement of the conveyor with the vertical movement of the carriage the upper bevel gear 74 is adjustably secured to the horizontal shaft 78 by means of an adjustable disc or member 79 on which the bevel gear 74 is mounted and which is adjustably secured by means of clamping screws or bolts 80 to a disc or member 81 which is fixed to the shaft 78 of the drive unit. The adjustable disc or member 79 is provided with slots 82 through which the clamping bolts or screws 80 pass and by means of rotary adjustment of the bevel gear 74 with relation to the shaft 78 an accurate timing of the conveyor with relation to the vertically movable carriage may be obtained. The screws 80 are preferably three in number and they are provided with lock nuts 83, but the number of the lock screws may, of course, be varied and any other suitable means may be provided for adjustably mounting the bevel gear 74 on the shaft 78. The upper bevel gear 75 is keyed or otherwise secured to the upper end of the vertical shaft which is journaled in upper and lower bearings 84 and 85. The lower bevel gear 76 is keyed or otherwise secured to the lower end of the vertical shaft 75 and the lower bevel gear 77 is fixed to the horizontal transverse shaft 71.

The step-by-step movement imparted to the conveyor by the drive unit is sufficient to actuate the endless conveyor a distance to carry one of the blade units away from the knives 32 and to bring the succeeding blade unit directly beneath the knives for another halving and pitting operation.

Figure 14:
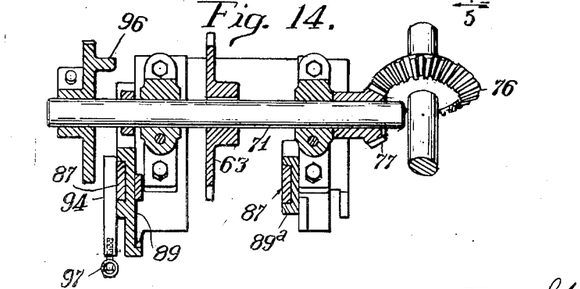
Fig. 14 is a transverse sectional view taken substantially on the line 14—14 of Fig. 12.

The pits are discharged from the blade units at the rear end of the conveyor as each blade unit passes around the rear end of the conveyor from the horizontal position to the inclined position illustrated in Fig. 1 of the drawings. This ejection of the pit from the blade unit is effected by means of a pit ejector slide 86 (see Figs. 3, 11, 12 and 13) composed of spaced parallel sides 87 and an outer curved connecting portion 88 preferably formed integral with the sides 87. The sides 87 are mounted in suitable guides 89. The slide has adjustably mounted on it at opposite sides pit-ejecting devices comprising arms 90 each provided with a pair of spaced parallel pins 91 and adjustably secured to the slide by means of bolts 92 passing through slots 93 which extend longitudinally of the arms 90. The spaced pairs of pins 91 extend inwardly from opposite sides of the slide and are adapted to straddle the pronged dart 53. The slide is provided with an arm 94 extending upwardly at an inclination and disposed approximately radially with relation to a cam wheel 95 provided with a plurality of cam lugs 96, preferably three in number. The cam wheel 95 is mounted on the shaft 71 and in the rotation thereof the cam lugs are successively moved into contact with the arm 94 and are adapted to carry the same upwardly against the action of a coil spring 97 which is distended by the upward movement of the slide 86 (Figs. 1 and 14). The upward movement of the slide 86 carries the pins upwardly along the opposite sides of the dart 53 and into engagement with the pit carried by the blade unit. As soon as the lug 96 moves out of engagement with the arm 94, the spring 97 quickly pulls the slide 86 downward and dislodges the peach pit which has been carried by the pronged dart to the position illustrated in Fig. 1 of the drawings.

The downward and outward movement of the spring actuated pit ejecting slide or member 86 is cushioned by means of coil springs 98 mounted on bolts 99 and bearing against a friction plate 99ª arranged to frictionally engage the slide or member 86 to effect the said cushioning of the same.

The pulley 11 (Fig. 6) is mounted on one end of a transverse worm shaft 100 exteriorly of the casing or housing of the drive unit; the worm shaft 100, which is journaled in suitable bearings, meshes with a worm wheel 101 mounted on a main longitudinal drive shaft 102 provided at one end with the exteriorly arranged crank 13 and the worm shaft and the worm wheel constitute speed reducing gearing for driving the main longitudinal shaft 102 for vertically reciprocating the carriage 15 at the desired speed. Any other suitable speed reducing gearing may, of course, be employed and the main longitudinal drive shaft is provided at its rear end with a bevel gear 103 which meshes with a bevel gear 104 mounted on a transverse crank shaft 105. The crank shaft 105, which is journaled in suitable bearings, is provided with a crank element 106 which cooperates with a Geneva wheel 107 and constitutes with the same indexing mechanism for intermittently actuating the rear transverse drive shaft 78 on which the Geneva wheel is mounted.

The crank element 106 comprises a cylindrical hub portion 108 which is cut away at 109 and which is provided at one side of the cut away portion with a projecting crank portion 110 having a roller 111 at its inner face for engaging radial recesses 112 formed in the side face of the Geneva wheel proximate the projecting crank portion 110. When the crank is rotated it successively engages the radial recesses 112 and intermittently rotates the Geneva wheel the distance intervening the radial recesses thereby producing a step by step movement of the Geneva wheel and the conveyor which is connected by the means hereinbefore described, with the shaft 78. As the roller 111 leaves one of the recesses at the completion of one of the step by step movements of the Geneva wheel, the next succeeding recess 112 is carried into position to receive the roller 111 when the crank through its rotation is again carried into position for engaging the Geneva wheel. The Geneva wheel is provided between the radially recessed portions 113 with concave arcuate peripheral portions 114 which are successively carried into position concentric with the hub portion of the crank element at the completion of each of the step by step movements of the Geneva wheel whereby the hub portion 108 is carried into the arcuate recess formed by an arcuate peripheral portion 114, thereby effectually locking the Geneva wheel and the conveyor against movement during the remaining portion of the rotation of the crank element, that is, until the roller 111 of the crank portion of the crank element is in position for engaging the next succeeding radial recess 112. The roller 111 is mounted on a suitable pivot pin 115 and is preferably provided with an anti-friction bearing which may be of any desired construction. The Geneva wheel is locked against rotary movement during the halving of the fruit, which will enable fruit to be manually placed on the blades of the stations or units with perfect safety while the conveyor is stationary.

I claim:

1. In a machine of the class described including a conveyor provided with blade units having means for engaging and holding the pit of the fruit, pit ejecting means located at one end of the conveyor and comprising spaced guides located at said end of the conveyor at opposite sides thereof, a pit ejecting slide having spaced sides slidable in said guides and provided with pit ejecting means arranged to extend transversely of the blade units in position for engaging and dislodging pits carried by the conveyor, a spring connected with the slide, and a cam arranged to move the slide in one direction and tension the spring and release the slide after the spring is tensioned whereby the spring will actuate the slide to dislodge the pits.

2. In a machine of the class described including a conveyor provided with blade units having means for engaging and holding the pit of the fruit, pit ejecting means located at one end of the conveyor and comprising spaced guides located at said end of the conveyor at opposite sides thereof, a pit ejecting slide having spaced sides slidable in said guides and provided with spaced parallel pit ejecting pins extending transversely of the blade units and positioned to dislodge the pits carried by the conveyor, a spring connected with the slide, and a cam arranged to move the slide in one direction and tension the spring and release the slide after the spring is tensioned whereby the spring will actuate the slide to dislodge the pits.

3. In a machine of the class described including a conveyor provided with blade units having means for engaging and holding the pit of the fruit, pit ejecting means located at one end of the conveyor and comprising spaced guides located at said end of the conveyor at opposite sides thereof, a pit ejecting slide having spaced sides slidable in said guides and provided with pit ejecting means arranged to extend transversely of the blade units in position for engaging and dislodging pits carried by the conveyor, a spring connected with the slide and adapted when tensioned to move the slide in one direction, a cam wheel provided with a plurality of spaced lugs and an arm extending from the slide arranged to be engaged by the lugs whereby the slide is actuated to tension the spring and is released to cause the spring to actuate the slide to dislodge the pits.

4. A machine for halving fruit and removing the pits thereof, including a support for the whole fruit, a vertically movable carriage over said support, fixed vertical guiding means for the carriage, driving mechanism for reciprocating the carriage toward and from the support, knives movably mounted on the carriage and arranged in two pairs with the cutting edges of one pair in opposing relation to the cutting edges of the other pair and with one flat face of each knife normally in juxtaposition to a flat face of the other knife of its pair, means yieldably urging the cutting edges of opposing pairs together so that upon the downward stroke of the carriage the knives cut the fruit, and means for laterally separating the knives of each pair for freeing the halves of the fruit from the pit thereof after being cut by the blade edges.

5. A machine for halving fruit and removing the pits thereof, including a support for the whole fruit, a vertically movable carriage over said support, fixed vertical guiding means for the carriage, driving mechanism for reciprocating the carriage toward and from the support, knife-carrying heads horizontally slidably carried by the carriage for vertical movement therewith, knives pivotally carried by the heads and arranged in two pairs with the cutting edges of one pair in opposing relation to the cutting edges of the other pair and with one flat face of each knife normally in juxtaposition to a flat face of the other knife of its pair, means yieldably urging the cutting edges of opposing pairs of knives together so that upon the downward stroke of the carriage the knives cut the fruit, and means for laterally separating the heads so as to laterally separate the knives of each pair for freeing the halves of the fruit from the pit thereof after being cut by the blade edges.

6. A machine for halving fruit and removing the pits thereof, including a support for the whole fruit, a vertically movable carriage over said support, fixed vertical guiding means for the carriage, driving mechanism for reciprocating the carriage toward and from the support, a pair of knife-carrying heads horizontally slidably carried by the carriage for vertical movement therewith, a set of two knives pivotally carried by each head, pairs of said knives each comprised of a knife from each set of knives arranged with the cutting edges of one pair of knives in opposing relation to the cutting edges of the other pair, means yieldably urging said heads together so as to yieldably maintain one flat face of each knife in juxtaposition to a flat face of the other knife of its pair, means yieldably urging the cutting edges of opposing pairs of knives together so that upon the downward stroke of the carriage the knives cut the fruit, and means for laterally separating the heads so as to laterally separate the sets of knives for freeing the halves of the fruit from the pit thereof after being cut by the blade edges.

7. A machine for halving fruits according to claim 4 wherein said knives have concavely curved, arcuate edge portions adapted to substantially conform to the contour of the pit of the fruit.

8. A machine for halving fruits according to claim 7 wherein said knives have lower convexly curved arcuate edge portions.

9. A machine for halving fruits according to claim 4 wherein said carriage carries a vertically movable normally downwardly urged plunger adapted to engage the fruit pit during the cutting operation and hold the pit against said support until after the fruit halves have been separated from the pit.

10. A machine according to claim 4 wherein said support includes a vertically disposed blade having an upper cutting edge provided with a pit-receiving recess substantially conforming to the exterior configuration of a portion of a fruit pit, and a dart including a pair of upwardly projecting prongs at the sides of the recess so as to engage opposite sides of the fruit pit.

11. A machine according to claim 4 wherein said support includes a vertiaclly disposed blade having an upper cutting edge provided with a pit-receiving recess substantially conforming to the exterior configuration of a portion of a fruit pit, and a dart including a pair of upwardly projecting prongs at the sides of the recess so as to engage opposite sides of the fruit pit, said carriage carrying a vertically movable normally downwardly urged plunger adapted to engage the fruit pit during the cutting operation and hold the pit in said pit-receiving recess and against said prongs until after the fruit halves have been separated from the pit.

12. A machine for halving fruit and removing the pits thereof, including a support for the whole fruit, a vertically movable carriage over said support, fixed vertical guiding means for the carriage, driving mechanism for reciprocating the carriage toward and from the support, a pair of knife-carrying heads horizontally slidably carried by the carriage for vertical movement therewith, a set of two knives pivotally carried by each head, pairs of said knives each comprised of a knife from each set of knives arranged with the cutting edges of one pair of knives in opposing relation to the cutting edges of the other pair, means yieldably urging said heads together so as to yieldably maintain one flat face of each knife in juxtaposition to a flat face of the other knife of its pair, means yieldably urging the cutting edges of opposing pairs of knives together so that upon the downward stroke of the carriage the knives cut the fruit, a knife-spreading cam engageable with said heads and pivotally carried by said carriage, and means carried by said driving mechanism engaging said cam so that at the approaching end of the downward stroke of the carriage said heads are separated thereby laterally separating the sets of knives for freeing the halves of the fruit from the pit thereof after being cut by the blade edges, and at the approaching end of the upward stroke of the carriage releasing said heads so that said knives can be yieldably urged to return to their initial cutting relationship.

13. A machine for halving fruit and removing the pits thereof, including a support for the whole fruit, a vertically movable carriage over said support, fixed vertical guiding means for the carriage, driving mechanism for reciprocating the carriage toward and from the support, a pair of knife-carrying heads horizontally slidably carried by the carriage for vertical movement therewith, a set of two knives pivotally carried by each head, pairs of said knives each comprised of a knife from each set of knives arranged with the cutting edges of one pair of knives in opposing relation to the cutting edges of the other pair, means yieldably urging said heads together so as to yieldably maintain one flat face of each knife in juxtaposition to a flat face of the other knife of its pair, means yieldably urging the cutting edges of opposing pairs of knives together so that upon the downward stroke of the carriage the knives cut the fruit, a knife-spreading cam engageable with said heads and pivotally carried by said carriage, said cam having a portion thereof defining a substantially triangular recess providing a pair of angularly related side walls, means carried by said driving mechanism for reciprocating movement with said carriage and laterally movable while disposed in the recess of said cam, the greatest amount of lateral movement of said last recited means occurring at the approaching end of the upward and downward strokes, the lateral movement of said last recited means at the approaching end of the down stroke effecting engagement of said latter means against one of said walls of the recess in said cam so as to effect pivoting movement thereof thereby laterally separating the sets of knives for freeing the halves of the fruit from the pit thereof after being cut by the blade edges, the lateral movement of said last recited means at the approaching end of the upward stroke freeing said heads for movement toward each other to return the sets of blades to their fruit cutting relationship.

CHARLES H. ANSLEY.

References Cited in the file of this patent

UNITED STATES PATENTS

| Number | Name | Date |
| --- | --- | --- |
| 436,629 | Ish | Sept. 16, 1890 |
| 1,159,575 | Eckles | Nov. 9, 1915 |
| 1,923,474 | Bem | Aug. 22, 1933 |
| 2,124,213 | Shackleton | July 19, 1938 |
| 2,185,090 | Millen | Dec. 26, 1939 |
| 2,403,518 | Gaddini | July 9, 1946 |
| 2,464,792 | Brenkert, Jr. | Mar. 22, 1949 |